United States Patent [19]
Comer

[11] 3,831,633
[45] Aug. 27, 1974

[54] SINGLE LEVER CONTROL FOR ACTUATING MULTIPLE CONTROL VALVES

[75] Inventor: Glen S. Comer, Peoria, Ill.

[73] Assignee: Caterpillar Tractor Co., Peoria, Ill.

[22] Filed: Apr. 28, 1972

[21] Appl. No.: 248,564

[52] U.S. Cl............................ 137/636.2, 74/471 XY
[51] Int. Cl............................ F16k 11/18, G05g 9/04
[58] Field of Search........ 137/636, 636.2; 74/471 R, 74/471 XY

[56] References Cited
UNITED STATES PATENTS
| | | | |
|---|---|---|---|
| 2,705,971 | 4/1955 | Dorkins | 137/636.2 |
| 3,131,574 | 5/1964 | Clingerman | 137/636 X |
| 3,388,609 | 6/1968 | Miller | 74/471 |

Primary Examiner—William R. Cline
Assistant Examiner—Richard Gerard
Attorney, Agent, or Firm—Phillips, Moore, Weissenberger, Lempio & Strabala

[57] ABSTRACT

A bracket is pivotally mounted at its first end on a stationary support for rotation about a first axis. A handle is pivotally mounted on a second end of the bracket for rotation about a second axis which is disposed transversely relative to the first axis. The handle and bracket each have an extension formed thereon which is connected to respective control valve stems whereby pivotal movement of the handle about the first axis will reciprocate one of the valve stems and pivotal movement of the handle about the second axis will reciprocate the other valve stem.

6 Claims, 1 Drawing Figure

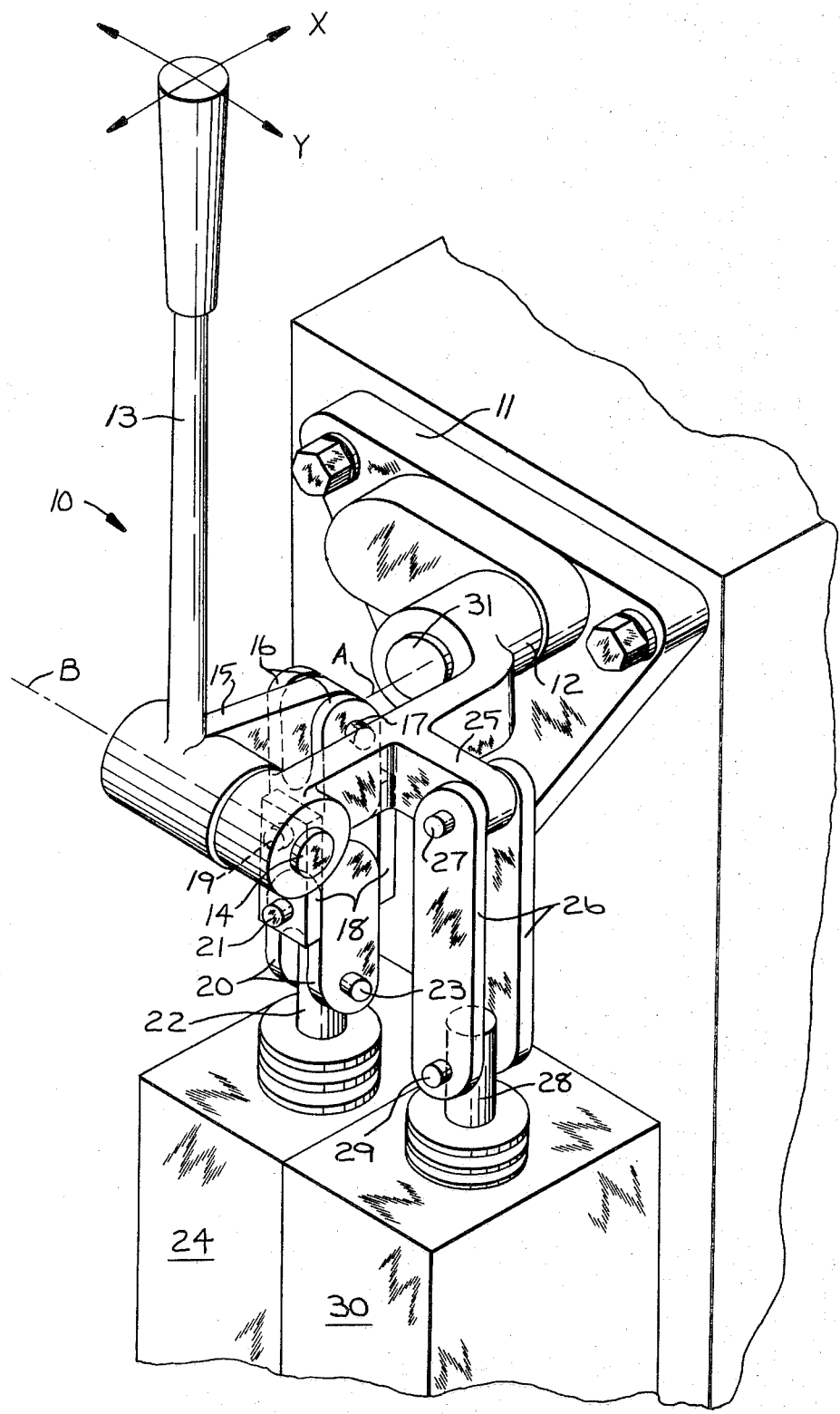

SINGLE LEVER CONTROL FOR ACTUATING MULTIPLE CONTROL VALVES

BACKGROUND OF THE INVENTION

Manually actuated control valves, employed in hydraulic circuits, normally utilize a single lever for actuating each valve individually. The increasing complexity of such circuits has dictated the need for a single lever adapted to control the actuation of two or more valves. Prior attempts to achieve such desiderata have resulted in single lever control arrangements which are bulky, complex and expensive to manufacture.

SUMMARY OF THE INVENTION

An object of this invention is to provide a compact, non-complex and economical single lever control adapted to actuate two or more valves employed in a hydraulic control circuit.

The single lever control comprises a stationary support having a bracket pivotally mounted at a first end thereof on the support for rotation about a first axis, a handle pivotally mounted on a second end of the bracket for rotation about a second, transverse axis and an extension secured to each of the handle and bracket adapted to actuate separate valve stems upon selective movement of the handle. In particular, pivotal movement of the handle about the first axis will function to reciprocate one of the valve stems whereas pivotal movement of the handle about the second axis will function to reciprocate the other valve stem. The single lever control further permits the two valve stems to be reciprocated simultaneously by the handle.

BRIEF DESCRIPTION OF THE DRAWING

Further objects of this invention will become apparent from the following description and accompanying drawing which is an isometric view of a single lever control embodying this invention.

DETAILED DESCRIPTION

The drawing illustrates a single lever control 10 comprising a stationary support bracket 11 which may be mounted in the operator's cab of a vehicle, such as a tractor. A generally U-shaped bracket 12 is pivotally mounted at a first end thereof on the support bracket by a first pivot means or pin 31 for limited rotation about a first horizontally disposed axis A. A handle 13 is pivotally mounted on a second end of bracket 12 by a second pivot means of pin 14 for rotation about a second axis B, disposed transversely relative to first axis A. The axes are preferably substantially perpendicular relative to each other and disposed in the same horizontal plane to intersect each other.

A first extension 15 is secured to the handle to extend toward pin 31 and in the general direction of first axis A. In the preferred embodiment, extension 15 is disposed in perpendicular relationship with axis B and is substantially co-linear with axis A. The free end of the extension is pivotally connected to a bifurcated upper end of a first clevis 16 by a pin 17.

The lower end of clevis is pivotally connected to a pair of transversely disposed links 18 by a pivot pin 19. The links are pivotally connected at their lower ends to the upper end of a second clevis 20 by a pin 21 whereas the lower, bifurcated end of the clevis is pivotally connected to a first valve stem 22 by a pin 23. The valve stem is reciprocally mounted for linear movement in the housing of a first control valve 24 to selectively move a valve spool (not shown) or the like to communicate hydraulic fluid therethrough.

A second extension 25 is secured intermediate the ends of bracket 12 to extend in the general direction of second axis B and away from first extension 15. The free end of the second extension is pivotally connected to a pair of vertically disposed links 26 by a pin 27. The lower ends of the links are pivotally connected to a second valve stem 28 by a pin 29. Valve stem is reciprocally mounted for linear movement in the housing of a second control valve 30 to selectively move a valve spool (not shown) or the like to communicate hydraulic fluid therethrough.

When the operator desires to actuate control valve 24 only, handle 13 is moved in direction X to pivot extension 15 about second axis B to reciprocate valve stem 22 via first linkage means comprising clevis 16 and 20 and links 18 which form a universal connection. Pivot pins 17 and 23 allow slight relative movement to occur between extension 15 and stem 22 in the A direction to compensate for such actuation. During reciprocation of the valve stem, either downwardly or upwardly, the clevises and links will remain in substantial linear alignment with each other.

When the operator desires to actuate control valve 30 only, handle 13 is moved in direction Y to pivot bracket 12 about axis A to reciprocate valve stem 28 via second linkage means comprising links 26. Compensation for the slight arcuate movement of extension 25 is effected by pivot pins 27 and 29 as well as by pivot pin 19. It should be noted that the handle may be moved in a compound direction wherein components of both X and Y are realized to thus move valve stems 22 and 28 simultaneously. It should be understood that additional valve stems could be operatively connected to bracket 12 and/or handle 13 by suitably arranged, added extensions and connecting linkage means.

What is claimed is:

1. A single lever control adapted to actuate separate valves comprising
   a stationary support,
   a bracket pivotally mounted at a first end thereof on said support by first pivot means for rotation about a first axis,
   a handle pivotally mounted on a second end of said bracket by second pivot means for rotation about a second axis disposed transversely relative to said first axis,
   a first extension, adapted for attachment to said stem of said first valve, secured to said handle to extend inwardly away from said second pivot means toward said first pivot means and in the general direction of said first axis, and
   a second extension, adapted for attachment to said stem of said second valve, secured to said bracket to extend in the general direction of said second axis.

2. The invention of claim 1 wherein said bracket is generally U-shaped and said second extension is secured to said bracket intermediate the ends thereof.

3. The invention of claim 1 wherein said first and second axes are substantially positioned perpendicular relative to each other and are disposed in the same horizontal plane to intersect each other.

4. The invention of claim 1 further comprising first and second linkage means pivotally interconnecting said first and second extensions, respectively, with a respective one of said valve stems whereby pivotal movement of said handle about said first axis will reciprocate one of said valve stems and pivotal movement of said handle about said second axis will reciprocate the other one of said valve stems.

5. The invention of claim 4 wherein said first linkage means universally connects said first extension to said first stem.

6. The invention of claim 5 wherein said second linkage means constitutes a pair of links.